(12) United States Patent
Xu et al.

(10) Patent No.: US 8,769,101 B2
(45) Date of Patent: Jul. 1, 2014

(54) METHOD, APPARATUS AND SYSTEM FOR PROCESSING COMPOSITE SERVICE AND REPLACING SERVICE AND INVOKING SERVICE

(75) Inventors: Wenhua Xu, Shenzhen (CN); Xiaomin Shi, Shenzhen (CN); Jianfeng Liu, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 12/614,074

(22) Filed: Nov. 6, 2009

(65) Prior Publication Data

US 2010/0057917 A1 Mar. 4, 2010

Related U.S. Application Data

(63) Continuation of application No. PCT/CN2008/072037, filed on Aug. 19, 2008.

(30) Foreign Application Priority Data

Aug. 31, 2007 (CN) .......................... 2007 1 0148480

(51) Int. Cl.
*G06F 15/173* (2006.01)

(52) U.S. Cl.
USPC .......... 709/226; 709/220; 709/223; 705/7.26; 705/7.27

(58) Field of Classification Search
USPC ....................................................... 709/226
See application file for complete search history.

(56) References Cited

U.S. PATENT DOCUMENTS

| | | | |
|---|---|---|---|
| 2002/0061741 A1 | 5/2002 | Leung et al. | |
| 2003/0144860 A1* | 7/2003 | Casati et al. | 705/1 |
| 2004/0157625 A1 | 8/2004 | Gheorghiu et al. | |
| 2005/0096960 A1 | 5/2005 | Plutowski et al. | |
| 2006/0095576 A1 | 5/2006 | Perry et al. | |
| 2007/0011281 A1* | 1/2007 | Jhoney et al. | 709/220 |
| 2008/0071597 A1* | 3/2008 | Chafle et al. | 705/8 |

FOREIGN PATENT DOCUMENTS

| | | |
|---|---|---|
| CN | 1531269 A | 9/2004 |
| CN | 1705307 A | 12/2005 |
| CN | 1764183 A | 4/2006 |
| CN | 101378324 B | 5/2011 |

OTHER PUBLICATIONS

Evren Sirin, Bijan Parsia, and James Hendler. Template-based composition of semantic web services. In AAAI Fall Symposium on Agents and the Semantic Web, Virginia, USA, Nov. 2005.*

(Continued)

*Primary Examiner* — Phuoc Nguyen
*Assistant Examiner* — June Sison
(74) *Attorney, Agent, or Firm* — Brinks, Gilson & Lione

(57) ABSTRACT

The present invention relates to a method for handling and replacing a service. The method for handling a composite service may include obtaining a concrete service corresponding to a service invocation segment description in a composite service logic, wherein the service invocation segment is an abstract service invocation segment or a service template invocation segment; triggering a service replacement, requesting to replace the service invocation segment with a concrete service invocation segment of the obtained concrete service; or, triggering a service invocation, requesting to generate a service invocation based on the concrete service. Accordingly, a concrete service can be dynamically selected when the composite service logic is being executed.

9 Claims, 7 Drawing Sheets

(56) References Cited

OTHER PUBLICATIONS

Aggarwal, Rohit, et al. "Constraint driven web service composition in METEOR-S." Services Computing, 2004.(SCC 2004). Proceedings. 2004 IEEE International Conference on. IEEE, 2004.*

Fluegge, Matthias "Challenges and Techniques on the Road to Dynamically Compose Web Services" Proceedings Int. Conf. on Web Engineering. Jul. 11, 2006.

Aggarwal, Rohit. "Constraint Web Service Composition in METEOR-S" IEEE International Conference on Services Computing. Sep. 15, 2004.

Supplementary European Search Report issued in corresponding European Patent Application No. 08 78 4028; mailed Aug. 2, 2010.

ITU—Telecommunication Standardization Sector, "Revised Version of Draft Recommendation Y.wsconv: Web Services based NGN Convergence Service Scenario" Q.8/13 Rapporteur Group Meeting: Seoul, Korea, Jul. 25-31, 2007.

Aggarwal et al., "Dynamic Web Service Composition in METEOR-S", LSDIS Lab, University of Georgia, Athens, IEEE 2004.

Sivashanmugam et al., "Framework for Semantic Web Process Composition", International Journal of Electronic Commerce, vol. 9(2), pp. 71-106. Winter May 2004.

ITU—Telecommunication Standardization Sector, Draft Recommendation Y.OSE-arch, Open Service Environment Functional Architecture for NGN (ITU-T SG13 meeting).Geneva, Jan. 12-23, 2009.

Extended European Search Report issued in corresponding European Patent Application No. 10011283.8, mailed Dec. 29, 2011.

Aggarwal et al., "Constraint Driven Web Service Composition in METEOR-S" The Computer Society. Proceedings of the 2004 IEEE International Conference on Services Computing (SCC '04) 2004.

Bradley et al., "The NEMO P2P Service Orchestration Framework" IEEE. Proceedings of the 37th Hawaii International Conference on System Sciences, 2004.

Fluegge et al., "Challenges and Techniques on the Road to Dynamically Compose Web Services" ICWE'06. Palo Alto, California, Jul. 11-14, 2006.

Office Action issued in corresponding Chinese Patent Application No. 200710148480.6; issued May 18, 20210.

Written Opinion of the International Searching Report issued in corresponding PCT Application No. PCT/CN2008/072037; mailed Nov. 27, 2008.

* cited by examiner

METHOD, APPARATUS AND SYSTEM FOR PROCESSING COMPOSITE SERVICE AND REPLACING SERVICE AND INVOKING SERVICE

CROSS-REFERENCE TO RELATED APPLICATIONS

This application is a continuation of International Application No. PCT/CN2008/072037, filed on Aug. 19, 2008, which claims priority to Chinese Application No. 200710148480.6, filed on Aug. 31, 2007, both of which are hereby incorporated by reference in their entireties.

FIELD OF THE INVENTION

The present invention relates to Internet, and more specifically to methods, apparatus and system for processing a composite service, replacing a service, and invoking a concrete service.

BACKGROUND

Service composition can be categorized into a static service composition and a dynamic service composition. For the static service composition, the composite service logic specifies in advance a concrete service to be invoked. That is, the service to be invoked is specified before the composite service logic is being executed. For instance, the composite service logic may be generated via a graphic user interface or text editor. Some service composition environment provides a graphic user interface, allowing users to be able to use a mouse to drag appropriate services from a service catalog to build up the composite service logic. Such mechanism may not be able to dynamically select and provide appropriate services to a requester in the runtime. Such mechanism has serious defects especially when the service is inaccessible.

For the dynamic service composition, the composite service logic specifies a service to be invoked in runtime such that some defects of the static service composition are addressed. Currently, dynamic service composition is mainly based on semantic technology. The dynamic service composition can be categorized into a semi-auto composition and auto composition. The semi-auto composition is directed to providing semantic service description when a user is defining a composite service logic. The user still needs to describe in advance the execution sequence of the services to be invoked. However, the auto composition only requires some necessary parameters before automatically generating the composite service logic, which means that the sequence for the services to be invoked is generated automatically and appropriate services are selected automatically. Generally, techniques such as Artificial Intelligence planning (AI planning) are used to automatically select services and generate the composite service logic.

Currently, the existing technique provides an implementation mechanism for converting an abstract composite service logic to a concrete composite service logic.

First, different stages for service composition are defined, namely, design stage, service selection stage, procedure generation stage and execution stage. A template of a semantic activity is used for designing a service composition procedure. Then, a service is dynamically selected for each activity. This step is repeated until each activity is replaced with a concrete service. Again, an executable procedure is generated based on all the concrete services. Finally, the executable composite service logic is executed.

Specifically, a process for using Ontology Web Language for Service (OWL-S) to replace activity with concrete service is described below. OWL-S is used to describe an activity. Semantic description is used to match a concrete service. Business Process Execution Language (BPEL) Script is then generated. The main feature is to employ OWL-S to describe service invocation. A service composition engine traverses the composite service logic. When the engine encounters the service invocation described in OWL-S, an "abstract-to-concrete" procedure is triggered. The service composition engine discovers a concrete service by virtue of OWL-S service description dynamically. The composite engine replaces the OWL-S service invocation description with an invocation description of the concrete service. BPEL script is generated until all the OWL-S service invocation descriptions are replaced.

Therefore, as can be seen, the foregoing process requires people to provide semantic description and the implementation is complex. Moreover, the foregoing process indirectly converts the abstract composite service logic into a concrete composite service logic, rather than directly executing the abstract composite service logic. Likewise, in the prior art, no mechanism of converting a concrete composite service logic into an abstract composite service logic is disclosed. Moreover, prior art does not solve the issue raised when the invoked service is not accessible during an execution process of a composite service logic.

SUMMARY

Methods and systems for handling a composite service, replacing a service, invoking a concrete service are provided according to embodiments of the present invention. As such, a concrete service can be dynamically selected when the composite service logic is being executed.

The present invention is also able to dynamically replace a concrete service with another concrete service having the same function when invocation of the concrete service fails during execution of a composite service.

In view of this, a method for handling a composite service is provided according to one embodiment of the present invention. The method includes:

obtaining a concrete service corresponding to a service invocation segment description in a composite service logic, wherein the service invocation segment is an abstract service invocation segment or a service template invocation segment; and triggering a service replacement, requesting to replace the service invocation segment with a concrete service invocation segment corresponding to the obtained concrete service; or, triggering a service invocation, requesting to generate a service invocation based on the concrete service.

A method for replacing a service is provided according to one embodiment of the present invention. The method includes:

acquiring service template information associated with concrete service invocation segment information in the composite service logic; and replace the concrete service invocation segment information in the composite service logic with the template information.

A method for invoking a concrete service is provided according to one embodiment of the present invention. The method includes:

acquiring service template information associated with a concrete service invocation segment description when a service described by the concrete service invocation segment is not able to provide service;

querying to obtain a concrete service according to the service template information;

generating a service invocation based on the concrete service.

Accordingly, an apparatus for handling a composite service is provided according to one embodiment of the present invention. The apparatus includes:

an acquisition unit, configured to acquire a concrete service corresponding to an abstract service invocation segment or a service template invocation segment in the composite service logic;

a trigger generation unit, configured to trigger a service composition adaption and request to replace the abstract service invocation segment or the service template invocation segment with the concrete service invocation segment of the acquired concrete service; or, generate a service invocation based on the concrete service.

An apparatus for replacing a service is provided according to one embodiment of the present invention. The apparatus includes:

a template information acquisition unit, configured to obtain, when detecting a service invocation segment in a concrete composite service logic, service template information corresponding to a service name of the concrete service description in the concrete composite service logic;

an adaption trigger unit, configured to trigger a service composition adaption and request to replace a concrete service invocation segment in the concrete composite service logic with the template information.

An apparatus for invoking a concrete service is provided according to one embodiment of the present invention. The apparatus includes:

a template information acquisition unit, configured to obtain service template information associated with a concrete service description when a concrete service invocation segment is not able to provide services;

a concrete service acquisition unit, configured to query a registration center according to the service template information so as to obtain the concrete service which matches the service template;

a service invocation generation unit, configured to generate a service invocation based on the concrete service.

A system for composite service is provided according to one embodiment of the present invention. The system includes: a service registration center, a composite service sub-system. The registration center includes a service center, configured to store service information;

a template center, configured to store template information, and a mapping relationship between a service and a service template.

The composite service sub-system may include one or more of an apparatus for handling a composite service, an apparatus for replacing a service and an apparatus for invoking a concrete service.

As can be seen, by converting an abstract composite service logic into a concrete composite service logic, a dynamic service composition and a dynamic service selection are achieved. A service invocation can be generated directly based on the service abstract description such that a step of converting into a concrete composite service logic can be omitted. Further, when the service invoked during execution of the composite service logic is not accessible, the service can be rolled back (replaced) dynamically. That is, associated template information is obtained according to a concrete service description and an appropriate service is dynamically selected to replace the invoked service. Accordingly, the invoked service can be dynamically replaced when the invoked service is inaccessible, and an abstract composite service logic can be generated automatically based on a concrete composite service logic.

DETAILED DESCRIPTION

By employing an abstract service description mechanism and a service template mechanism, embodiments of the present invention provide a mechanism for converting an abstract composite service logic into a concrete service logic but also provides a mechanism for directly executing an abstract composite service logic. Moreover, embodiments of the present invention further provides a process for automatically generating an abstract composite service logic, which is able to directly generate an abstract composite service logic based on a concrete composite service logic. When the service invoked during execution of the composite service logic is not accessible, the service can be rolled back (replaced) dynamically. That is, the concrete service description is converted to a template description and an appropriate concrete service is dynamically selected for replacement according to the mapping between the template and the service.

According to one embodiment, when a concrete service is being invoked, three pieces of information are required: Service, Operation, Variables. The Variable can be divided into input variables and output variables. For instance, the partner Link, operation, input Variable, output Variable in the BPEL script specify corresponding values for Service, Operation, input Variable, output Variable. However, the BPEL simply realizes a static service composition. In practice, there exists a need for dynamic service composition. In other words, there is a need to dynamically invoke an appropriate service to meet the requirement of the user during service execution process.

To meet the requirement of a dynamic service composition, there is provided an abstract service description mechanism according to one embodiment of the present invention. The abstract service description mechanism supports a dynamic service composition. The abstract service description mechanism does not specify concrete invocation information. That is, the abstract service description mechanism does not specify all the values for Service, Operation, input Variable, output Variable. However, the abstract service description mechanism is able to discover an appropriate service according to the information provided by Service, Operation, input Variable, output Variable. Such dynamic service composition is referred to as abstract service description based service composition. If none of the values for Service, Operation, input Variable, output Variable is specified, but a corresponding template name is assigned, such dynamic service composition is referred to as template based service composition.

Figure 1:
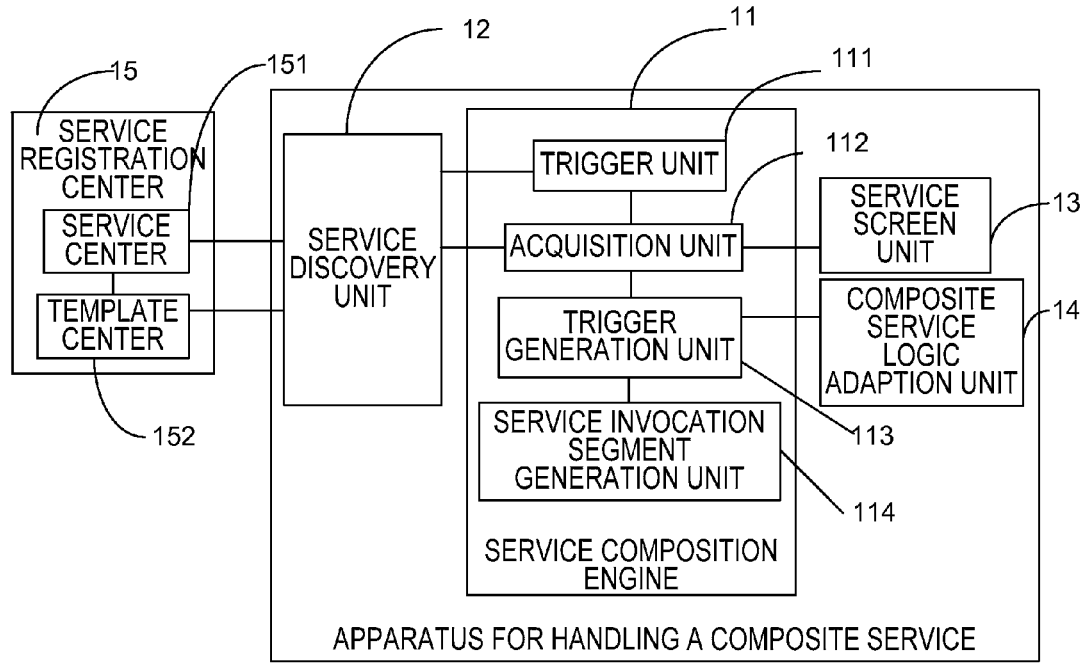
FIG. 1 is block diagram of an apparatus for handling a composite service according to one embodiment of the present invention.

The abstract service description can be categorized into a base criteria description and an extension criteria description (hereinafter "base description" and "extension description".) The base description includes a criteria description of Service, a criteria description of Operation, a criteria description of an input Variable, a criteria description of an output Variable. The extension description refers to descriptions other than the criteria description of Service, the criteria description of Operation, the criteria description of an input Variable, the criteria description of an output Variable, for instance, description of Quality of Service (QoS). The base description is used to discover a desirable service list from a service catalog during a dynamic service composition, while the extension description is used to select a service meeting a screening requirement from the found service list. The service description is illustrated in FIG. 1.

TABLE 1

| | Service | |
|---|---|---|
| Concrete Service Description | Operation | |
| | Input Variable | |
| | Output Variable | |
| | | Service Criteria |
| Abstract Service Description | Base Criteria | Operation Criteria |
| | | Input Variable Criteria |
| | | Output Variable Criteria |
| | Extention Criteria | Qos |
| | | . . . |

In the base description of the abstract service description, the Service Criteria may include description for a plurality of service types. For instance, when XML description is employed, the Service Criteria may include a plurality of sub-elements of Attribute Group. Each sub-element includes two attributes which specify types of service and values of the types respectively. For instance, if a certain service belongs to "Shenzhen" when categorized by area, then its type is "area", with its value of "Shenzhen". The service is described as <attribute Group category="area" name="shenzhen"/>. The Operation Criteria includes an attribute "name" by which a vague search can be done. The inputVariableCriteria/outputVariableCriteria includes an attribute "type", indicating the type of a variable.

The extension description of the abstract service description may include a plurality of sub-elements, among which the QoS is a critical sub-element. The QoS further includes several attributes, including "delaytime."

In the abstract description based dynamic composition, at least one of the values for the Service, Operation, inputVariable, outoutVariable in the concrete service description can not be assigned with a specific value. Only in this case, the abstract description, i.e., Service, Operation, inputVariable, outputVariable, associated with the base description of the abstract service description are needed to correspond to serviceCriteria, operationCriteria, inputVariableCriteria, outputVariableCriteria, respectively. The attribute which is not assigned with a specific value is specified by a related description in the base description of the abstract service description. Further, related information provided by the extension description is used to assist the discovery of the service.

Example of an abstract description of the service is illustrated hereinafter. The Service and serviceCriteria, Operation and operationCriteria, inputVariable and inputVariableCriteria, outputVariable and outputVariableCriteria correspond to each other. Only when the former value is uncertain (assume "##" denotes uncertainty), the extension description of the latter one will be needed. That is, the extensionCriteria exists only when at least one of Service, Operation, inputVariable, outputVariable is "##". By way of example, an abstract service is described hereinafter.

```
<serviceDescription service="##" operation="##"
variable="##">
    <baseCriteria>
        <serviceCriteria>
    <attributeGroup category="categoryName" name="keywordValue"/>
        </serviceCriteria>
        <operationCriteria name="keywordValue"/>
        <variableCriteria type="typeName"/>
    </baseCriteria>
    <extentionCriteria>
        <qos>
            <delaytime unit="timeUnit">value</delaytime>
        </qos>
    </extentionCriteria>
</serviceDescription>
```

The template is described by related attributes in the base description of the abstract service description. Each template corresponds to a service of a specific category. The serviceCriteria of the service description can be utilized directly to describe the template category. The template itself does not contain the extension description. However, the extension description may be used in connection with the template to select a concrete service. Of course, the template has some attributes of its own, for example, template name, etc. The template information includes service type, operation, input variable, output variable, etc. The following illustration describes a template.

```
<templateDescription template="templateName">
    <serviceCriteria>
    <attributeGroup category="categoryName" name="keywordValue"/>
    </serviceCriteria>
    <operationCriteria name="keywordValue"/>
    <inputVariableCriteria type="typeName"/>
    <outputVariableCriteria type="typeName"/>
</ templateDescription>
```

In the template based dynamic composition, all of the values for Service, Operation, inputVariable, outputVariable in the concrete service description are not specified. One can just provides a template name or provide the template name in connection with a template description. Definition of the template is done by inserting an attribute "template" in the baseCriteria. The value of the attribute "template" is a unique ID for the template. For instance, a service invocation segment based on template name is illustrated hereinafter.

```
<serviceDescription>
    <baseCriteria template=" templateName"/>
    <extentionCriteria>
        <qos>
            <delaytime unit="timeUnit">value</delaytime>
        </qos>
    </extentionCriteria>
</ serviceDescription>
```

For instance, a service invocation segment based on detailed description of the template is illustrated below. No concrete service description in the service description is required. The detailed description of the template is consistent with the template name in the above example.

```
<serviceDescription>
    <baseCriteria template=" templateName">
        <serviceCriteria>
                    <attributeGroup category="categoryName"
                        name="keywordValue"/>
        </serviceCriteria>
        <operationCriteria name="keywordValue"/>
        <inputVariableCriteria type="typeName"/>
        <outputVariableCriteria type="typeName"/>
    </baseCriteria>
    <extentionCriteria>
        <qos>
            <delaytime unit="timeUnit">value</delaytime>
        </qos>
    </extentionCriteria>
</ serviceDescription>
```

As can be seen, there is a certain mapping relationship between the template and the service. The mapping relationship indicates that the template can map to those services. That is, services that have mapping relationship with the template may be selected dynamically based on the template. Further, a service template may be located by virtue of a service name.

In the present invention, the composite service logic is categorized into an abstract composite service logic and a concrete composite service logic. The abstract composite service logic implies that a service abstract description exists in the composite service logic. The concrete composite service logic implies that all that are included in the composite service logic are concrete service description. The service abstract description herein includes a template description. Service invocation described by the abstract description with specified template name is referred to as service template invocation segment. Dynamic composition thereby is referred to as a template description based dynamic composition. Service invocation segment described by the abstract description without specified template name is referred to as abstract service invocation segment. Dynamic composition thereby is referred to as abstract service description based dynamic composition.

To facilitate the understanding the present invention, detailed description is provided in conjunction with the accompanying drawings.

FIG. 1 illustrates a block diagram of an apparatus for handling a service composition. The apparatus is used to implement the functionality of service composition. The apparatus is capable of executing a concrete composite service and an abstract composite service. The apparatus includes a service composition engine 11, a service discovery unit 12, a service screen unit 13 and a composite service logic adaption unit 14. The service composition engine 11 further includes an acquisition unit 112 and a trigger generation unit 113. Preferably, the service composition engine 11 may further include a trigger unit 111.

The trigger unit 111 is configured to trigger an approach of handling a composite service logic based on service abstract description (including template description). The trigger unit 111 is configured to trigger an invocation and trigger a replacement. The acquisition unit 112 is configured to obtain a concrete service corresponding to the abstract service invocation segment or the service template invocation segment in the composite service logic. The trigger generation unit 113 is configured to trigger the adaption for composite service, requesting to replace the abstract service invocation segment or the service template invocation segment with the concrete service invocation segment of the obtained concrete service, or the trigger generation unit 113 is configured to generate a service invocation based on the concrete service.

The service composition engine 11 is configured to distinguish between the concrete composite service logic and the abstract composite service logic; execute the concrete composite service logic according to the type of composite service logic or trigger an abstract description/template based dynamic service composition; trigger a service discovery request to query a service catalog according to the service abstract description (including template description) in the composite service logic; and trigger a service screening request according to the service obtained by the service discovery unit 12, and requesting a screening request from the service screen unit 13; trigger the adaption of the composite service logic according to the service acquired by the service screen unit 13 and request the composite service logic adaption unit 14 to replace the abstract description (including template description) in the abstract composite service logic with the concrete service; acquire corresponding template information according to the invoked concrete service wherein the template information is used for automatically generating the abstract composite service logic or the template information is used for rollback when invocation of the service fails.

Automatically generating the abstract composite service logic refers to generating the abstract composite service logic based on the concrete composite service logic so that the composite service logic may bind to the service dynamically. Rollback refers to acquire, when invocation of the service fails, template information associated with the service and obtain a service having the same function associated with the template.

Preferably, the service composition engine 11 may further include a service invocation segment generation unit 114, configured to generate a service invocation based on the replaced concrete service invocation segment.

It is to be noted that the trigger unit 111, the acquisition unit 112 and the trigger generation unit 113 may be integrated in the service composition engine or may be provided separately.

The service discovery unit 12 is coupled to the trigger unit 111. The service discovery unit 12 is used to generate a service discovery request according to the abstract service description (including template description) and query the service registration center according to the service discovery request and acquire a qualified service list and send the service list to the service composition engine.

Figure 11:
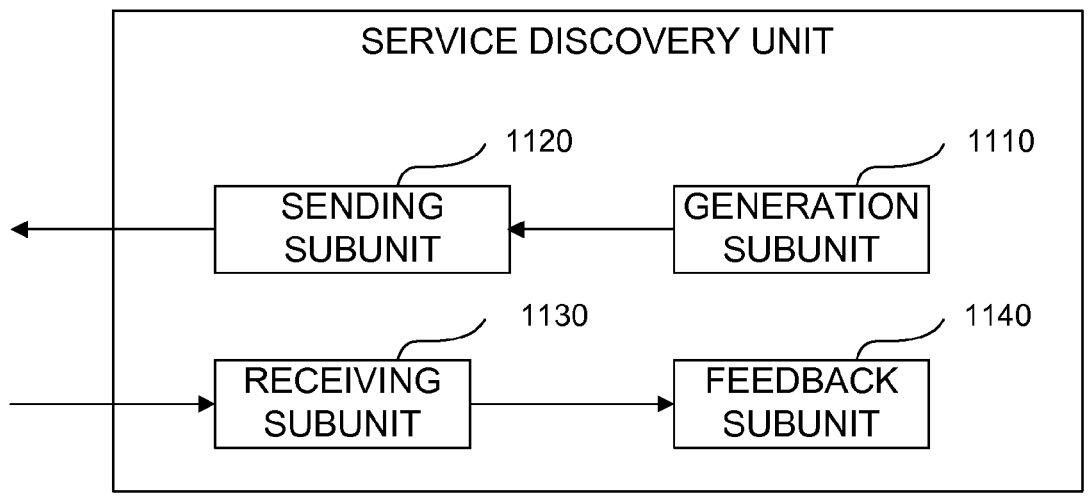
FIG. 11 is block diagram of a service discovery unit according to one embodiment of the present invention.

Referring to FIG. 11, the service discovery unit 12 includes a generation subunit 1110, a sending subunit 1120, a receiving subunit 1130 and a feedback subunit 1140. The generation subunit 1110 is configured to generate the service discovery request according to the abstract service description information. The sending subunit 1120 is configured to send service query information to the service registration center. The query information includes a query type, a service description and a restriction condition, or a query type, a template description and a restriction condition. The receiving subunit 1130 is configured to receive the service list which matches the query information fed back from the service registration center. The service list includes one or more concrete services. The feedback subunit 1140 is configured to feed back the service list.

That is, the service discovery unit 12 is configured to generate the service discovery request according to the abstract service description provided by the abstract composite service logic and query the service registration center based on the service discovery request. That is, a qualified concrete service list is discovered and returned to the service composition engine 11 (for the discovery based on the abstract service description, which is not template description, the service discovery unit 12 may search for the service directly; or may search the template first and then search for the service based on the template; for the discovery based on the template description, the service discovery unit 12 may search for the service directly) and find the corresponding template based on the concrete service information.

The service screen unit 13 is configured to screen, when receives a service screen request triggered by the service composition engine, the service list according to its screening requirement and obtain a service list meeting the screening requirement, select a concrete service from the obtained service list and feed back the concrete service to the acquisition unit 112 in the service composition engine 11.

The composite service logic adaption unit 14 is configured to replace, when receiving the request for adaption of the composite service logic from the service composition engine 11, the abstract service invocation segment or the service template invocation segment with the concrete service invocation segment of the acquired concrete service. That is, the composite service logic adaption unit 14 replaces the abstract description of the service in the abstract composite service logic with the concrete service provided by the service composition engine 11, and replaces the concrete description of the service in the composite service logic with the template according to the template information provided by the service composition engine.

In the present embodiment, the process of service discovery unit 12 querying the service registration center 15 is described hereinafter. The service registration center 15 for storing the service information and the service template information includes a service center 151 and a template center 152. The service center 151 and the template center 152 may be regarded as two views in the service registration center. A mapping relationship is used to link a service with a template. The template center includes a unique service ID which corresponds to a template ID. The service center includes a unique service ID which corresponds to service information. Of course, the template center also includes template information associated with the template ID. The template information at least includes basic information: service category information, operations and parameters. The service information at least includes basic information, service category information, operations and parameters, and may further include extension information such as Quality of Service (QoS).

The service center 151 is used to store the service information. The service information can be categorized into two types: atomic service and composite service. The atomic service does not need to invoke other services to implement its function. The composite service is described by the composite service logic and needs to invoke other service to implement its function.

The template center 152 is configured to store the service template information, and the mapping information between the service template and the service. A service template may correspond to one or more services.

Furthermore, in this embodiment, the service discovery unit 12 and the service screen unit 13 may also interact with each other directly, that is, the interaction does not need to be controlled via the service composition engine 11.

Figure 2:
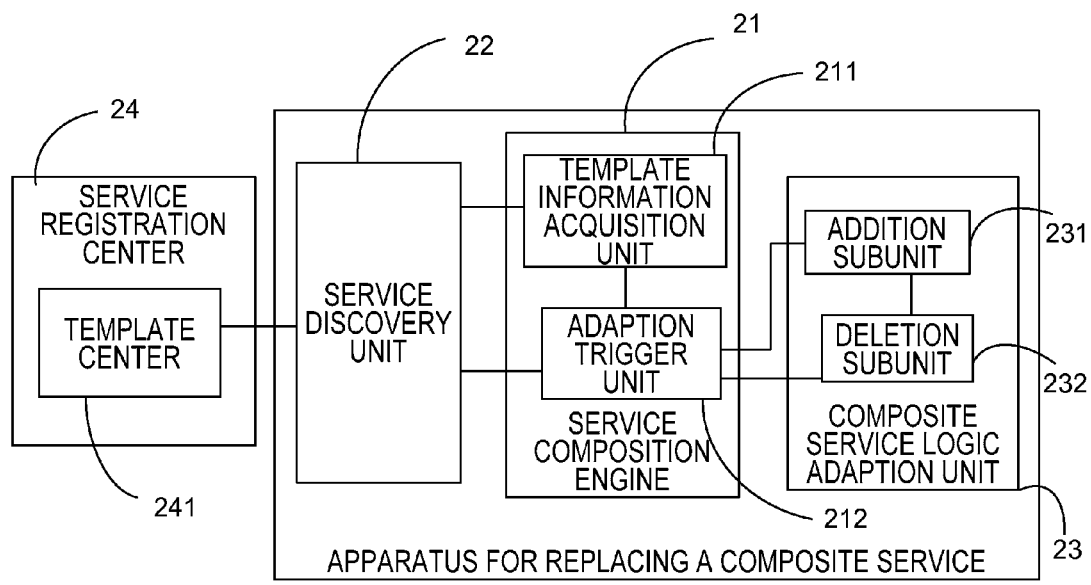
FIG. 2 is block diagram of an apparatus for replacing a service according to one embodiment of the present invention.

FIG. 2 illustrates a block diagram of an apparatus for replacing a service according to one embodiment of the present invention. The apparatus includes a service composition engine 21 and a composite service logic adaption unit 23. The apparatus may further include a service discovery unit 22. To facilitate understanding, FIG. 2 also includes a service registration center 24 and its template center 241. The service composition engine 21 may further include a template information acquisition unit 211 and an adaption trigger unit 212. The composite service logic adaption unit 23 includes an addition subunit 231 and a deletion subunit 232.

The template information acquisition unit 211 is configured to obtain, when detecting the service invocation segment in the concrete composite service logic, service template information corresponding to the service name of the concrete service description in the concrete composite service logic.

The adaption trigger unit 212 is configured to trigger the adaption of the service composition and request to replace the concrete service invocation in the concrete composite service logic with the template information.

It is to be noted that the template information acquisition unit 211 and the adaption trigger unit 212 may be integrated in the service composition engine or may be provided separately.

The composite service logic adaption unit 23 is configured to replace the concrete service invocation segment in the concrete composite service logic with the template information when receiving the request for adaption of the composite service logic from the adaption trigger unit. Specifically, the composite service logic adaption unit 23 includes an addition subunit 231, configured to add a base description portion of the service abstract description into the concrete service invocation segment in the concrete composite service logic, and add a template name and a corresponding template description into the base description portion. The composite service logic adaption unit 23 may further include a deletion subunit 232, configured to delete the corresponding concrete service description when the addition subunit completes the addition.

Figure 12:
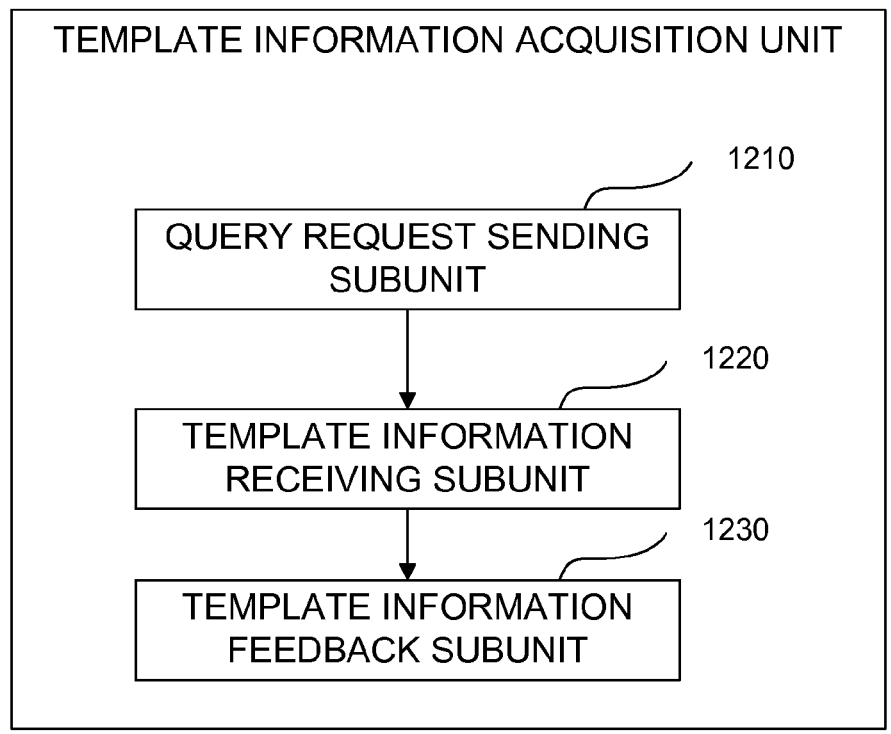
FIG. 12 is block diagram of a template information acquisition unit according to one embodiment of the present invention.

The template information acquisition unit 211 is configured to trigger, based on the concrete service description, a service template query request to the service discovery unit 22. Referring to FIG. 12, the template information acquisition unit 211 includes a query request sending subunit 1210, a template information receiving subunit 1220, a template information feedback subunit 1230. The query request sending subunit 1210 is configured to send the service template query request to the service discovery unit based on the concrete service description. The service discovery subunit 1210 is configured to send service query information to the template center according to the template query request. The service query information includes a service name (i.e., service ID) of a concrete service invocation description. The template information receiving subunit 1220 is configured to receive service template information corresponding to the service name wherein the service template information is fed back from the template center. The service template information includes a template name and a template description. The template information feedback subunit 1230 is configured to feed back the service template information to the service composition engine.

The service discovery unit 22 is configured to send query information to the template center 241 in the service registration center 24 according to the received template query request. The query information includes a service name of the concrete service description. The service discovery unit 22 further includes a template information receiving unit and a template information feedback unit. The template information receiving unit is configured to receive the service template information corresponding to the service name wherein the service template information is fed back from the template center 241. The service template information includes a template name and a template description. The template information feedback unit is configured to feed back the service template information to the service composition engine.

Figure 3:
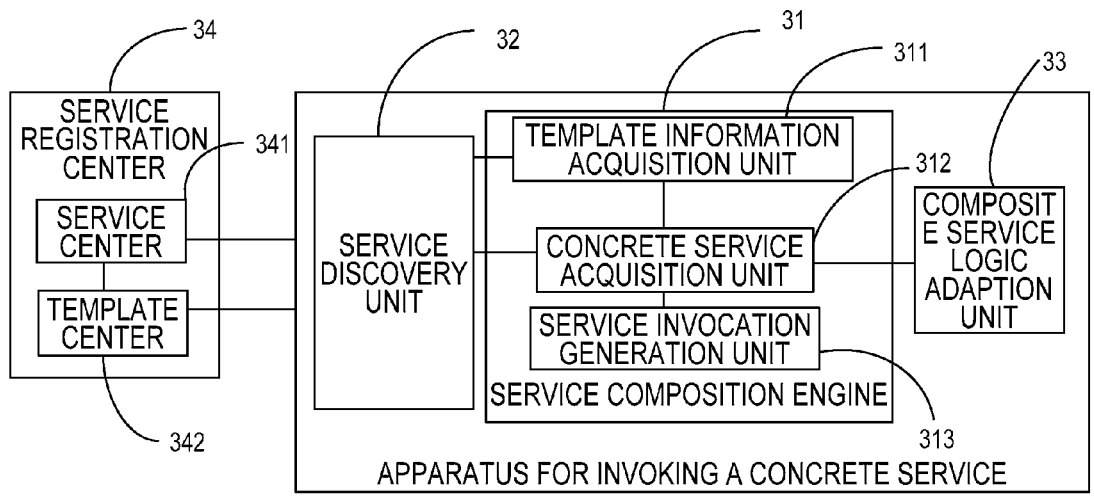
FIG. 3 is block diagram of an apparatus for invoking a concrete service according to one embodiment of the present invention.

FIG. 3 illustrates a block diagram of an apparatus for invoking services according to one embodiment of the present invention. The apparatus includes a service composition engine 31. The service composition engine 31 may include a template information acquisition unit 311, a concrete service acquisition unit 312 and a service invocation generation unit 313. The apparatus may further include a service composition engine 32 and a composite service logic adaption unit 33. To facilitate understanding, FIG. 3 also includes a service registration center 34 which includes a service center 341 and a template center 342. The template information acquisition unit 311 is configured to acquire service template information associated with the concrete service description in the concrete composite service logic when the service described by the service invocation segment in the concrete composite service logic is not able to provide service. The concrete service acquisition unit 312 is configured to query the template center by virtue of the service discovery unit according to the service template information and acquire the concrete service which matches the service template, and subsequently query the service center to acquire the concrete service information. The service invocation generation unit 313 is configured to generate a service invocation according to the concrete service.

Preferably, referring to FIG. 12, the template information acquisition unit 311 includes a query request sending subunit 1210, a template information receiving subunit 1220 and a template information feedback subunit 1230. The query request sending subunit 1210 is configured to send the service template query request to the service discovery unit based on the concrete service description. The service discovery subunit 1210 is configured to send service query information to the template center according to the template query request. The service query information includes a service name (i.e., service ID) of a concrete service invocation description. The template information receiving subunit 1220 is configured to receive service template information corresponding to the service name wherein the service template information is fed back from the template center. The service template information includes a template name and a template description. The template information feedback subunit 1230 is configured to feed back the service template information to the service composition engine.

Therefore, the service composition engine may support the concrete composite service logic and the abstract composite service logic. The service composition engine not only supports the abstract composite service logic to automatically generate the concrete composite service logic, but also supports to generate service invocation based on the abstract description segment. Further, the service composition engine supports to dynamically select other service for replacement when the service invocation fails and also supports the concrete composite service logic to automatically generate the abstract composite service logic.

The service composition engine supports a direct execution mode and indirect execution mode for the execution of the abstract composite service logic. The direct execution mode refers to that the service composition engine directly executes the abstract composite service logic without firstly converting the abstract composite service logic to the concrete composite service logic. The service composition engine directly invokes the corresponding service after the service composition engine detects the abstract description. The indirect execution mode refers to that the service composition engine replaces the abstract composite service logic with the concrete composite service logic first and then executes the concrete composite service logic and invokes the corresponding services. The direct execution mode may also support the generation of concrete composite service logic. After the service composition engine detects the abstract description, the service composition engine replaces the abstract description with the concrete service invocation and then directly invokes the service. The difference between the two modes is that the indirect mode needs to replace all the abstract descriptions in the abstract composite service logic with the concrete service before running. However, the method for generating concrete composite service logic based on direct mode does not need to replace all the abstract composite service logics. The direct execution mode also supports the mechanism for selecting other service to provide service when the invocation of the concrete service fails.

The service composition engine may support the process for generating the abstract composite service logic according to the concrete composite service logic.

The service composition engine may support the concrete composite service logic invocation and the abstract composite service logic invocation. The composite service logic is constituted by a variety of service invocation segments. Each service invocation segment may be described by the concrete service or may be described by the abstract service (including template). The former one is referred to as the concrete service invocation segment. For the abstract service description (including template), the abstract service description of the designated template name is referred to as the service template invocation segment. The template name which is not designated is referred to as abstract service invocation segment.

Figure 4:
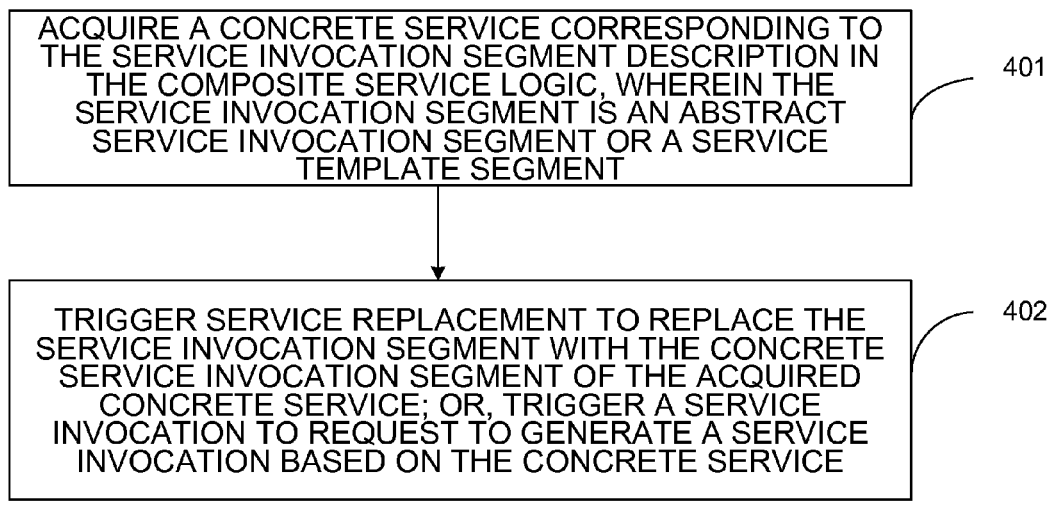
FIG. 4 is a flowchart of a method for handling a composite service according to one embodiment of the present invention.

Accordingly, a method for processing composite service is also provided according to one embodiment of the present invention. The process of the method is illustrated in FIG. 4. The method includes the following steps.

Step 401: A concrete service corresponding to the service invocation segment description in the composite service logic is acquired. The service invocation segment is an abstract service invocation segment or a service template invocation segment.

Step 402: Service replacement is triggered to replace the service invocation segment with the concrete service invocation segment of the acquired concrete service. Or, service invocation is triggered to generate the service invocation based on the concrete service.

In step 401, the process of acquiring the concrete service corresponding to the abstract service invocation segment or the service template invocation segment in the composite service logic includes querying, based on the service discovery request, the service registration center for services. The information of the service query includes a query type, a service description and a restriction condition, or a query type, a template description and a restriction condition; receiving the service list which qualifies the query information fed back from the service registration center, wherein the service list includes one or more concrete services; selecting and feeding back one concrete service among the service list.

Preferably, the process of generating the service discovery request according to the description of the abstract service invocation segment includes generating a service template discovery request according to the base description in the abstract service invocation segment information, wherein the base description includes a service type, operation information, parameter information; conducting a service template query according to the service template discovery request so as to acquire the service template information that matches the base description.

Preferably, replacing the abstract service invocation segment or the service template invocation segment in the process of generating service invocation based on the concrete service includes replacing a service before generating the service invocation or invoking the service or after the invocation.

Furthermore, generating service invocation in the replacement process includes generating, before replacement, a service invocation based on the acquired concrete service; or generating, after replacement, a service invocation based on the acquired concrete service or replaced concrete service invocation segment; or generating a service invocation based on the acquired concrete service during replacing.

The method may further include triggering, before requesting for replacement, a screen on the service list and obtaining the concrete service meeting the screening requirement; generating, then, the service invocation based on the concrete service; or generating the service invocation based on the replaced concrete service invocation segment. The process of generating service invocation includes triggering a service invocation, extracting necessary information from the concrete service and generating the service invocation based on the extracted necessary information, or directly generating the service invocation based on the concrete service invocation segment. The necessary information may include a service address, a service name, an operation or a parameter.

Figure 5:
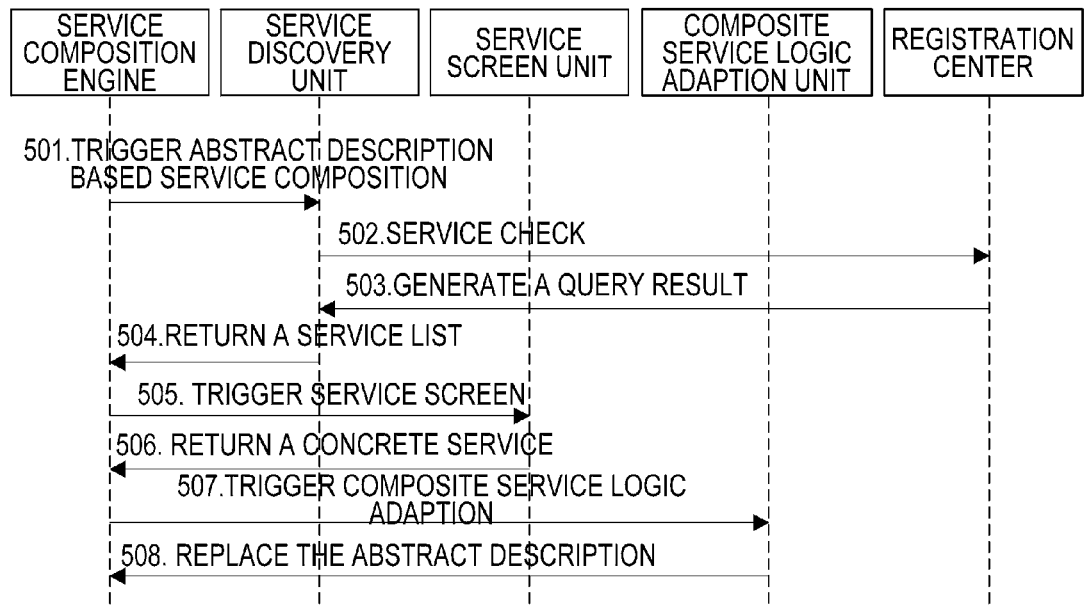
FIG. 5 is a flowchart of a service composition engine generating a concrete description based on an abstract description according to one embodiment of the present invention.

The implementation of the embodiment is described in FIG. 5. FIG. 5 is a flowchart of the service composition engine indirectly executing an abstract composite service logic according to one embodiment of the present invention (i.e., generate a concrete description based on the abstract description). As illustrated in FIG. 5, when the service composition engine detects the abstract description, the service composition engine executes the process of generating the concrete description based on the abstract description until all the abstract descriptions are replaced with the concrete service descriptions. Specifically, the process includes the following steps.

Step 501: The service composition engine triggers abstract description based service composition. The service composition engine checks the composite service logic. If the service composition engine detects that there is no abstract description in the composite service logic, i.e., all of Service, Operation, inputVariable, and outputVariable in the concrete service description are assigned with a concrete value, then it is indicated that the composite service logic is a concrete composite service logic and the abstract description based service composition will not be triggered. The process ends. If some portion in the script of the composite service logic includes abstract description, i.e., one of Service, Operation, inputVariable, outputVariable is not assigned with a concrete value (e.g., may be assigned with a specific value "##"), then it is indicated that such portion in the script is abstract description script. The service composition engine triggers abstract description based service composition.

Step 502: The service composition engine make a query to the registration center. That is, after the service composition engine determines that the script is the abstract description, the service composition engine triggers the service discovery unit to make a query to the service registration center. The query information includes a query type, a service description and a restriction condition; or a query type, a template description and a restriction condition. The service description includes concrete service description and base description of the abstract service description. The restriction condition is the extension description of the abstract service description. The template description may be a template name or a concrete description for the template, i.e., the base description of the abstract service description. The query type includes a query based on service description and a query based on template description. For a given template name, the query is done based on the template description directly; otherwise, the query can be done based either on template description or on service description. Querying based on template description refers to querying template information and further obtaining the service information.

Step 503: The service registration center feeds back the query result. That is, the service registration center performs query based on the query information delivered by the service discovery unit and returns a qualified service list. The concrete query process is explained in detail in FIG. 6.

Step 504: The service discovery unit returns the service list to the service composition engine. That is, the service discovery unit will return the obtained query result, i.e., the qualified service list, to the service composition engine.

Step 505: The service composition engine triggers a screening process to the service screen unit and sends the service list to the service screen unit.

Step 506: The service screen unit feeds back the concrete service. That is, the service screen unit screens the service list based on its own screening condition and filters the unqualified service. The screening condition includes service availability, etc. These screening conditions are relatively independent of services and are complementary to the restriction condition of the service abstract description to some degree. If there is a plurality of services after screening, a service is selected at random and provided to the service composition engine.

Step 507: The service composition engine triggers the adaption for composite service logic based on the obtained service and requests the composite service logic adaption unit to replace the abstract description based on the concrete service provided.

Step 508: The abstract description is replaced. The composite service logic adaption unit extracts necessary information from the service information, such as service name, operation, parameter, etc. and completes the concrete service description in the abstract service description, and meanwhile deletes the base description and extension description of the abstract service description.

Figure 6:
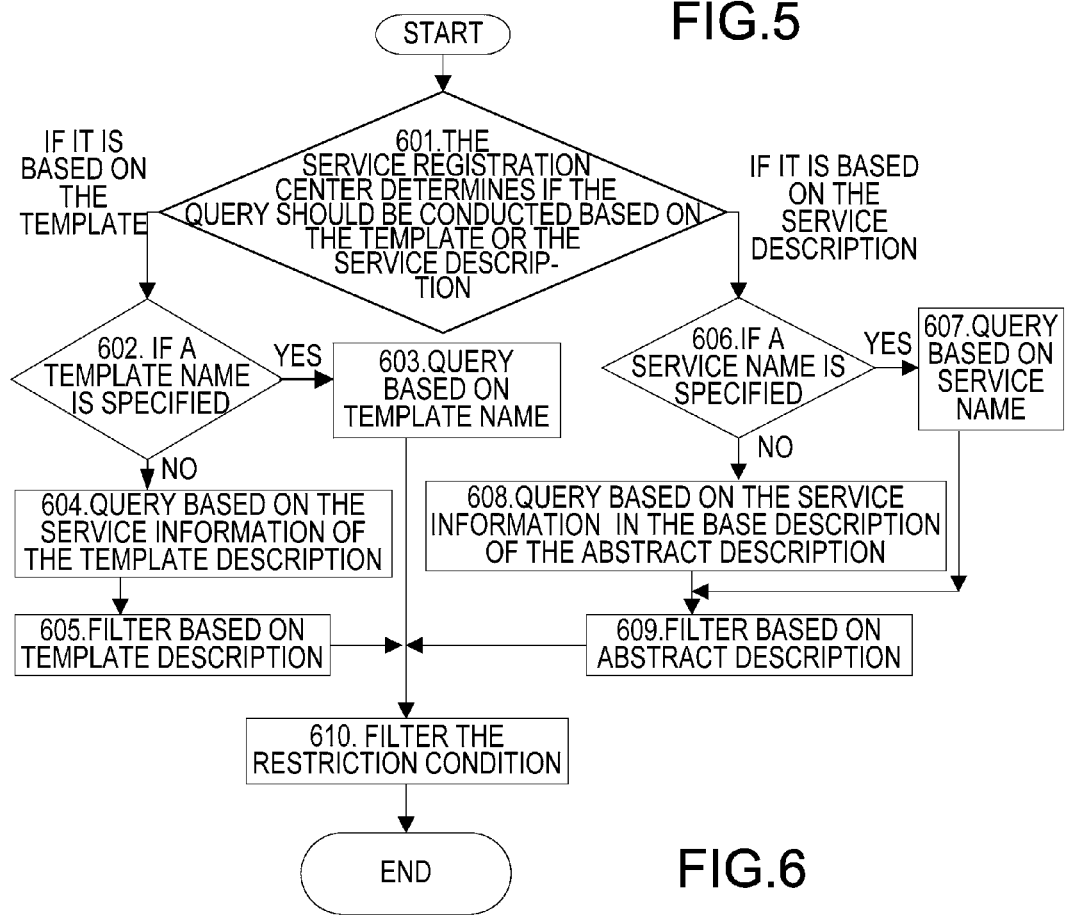
FIG. 6 is a query flowchart for a service registration center according to one embodiment of the present invention.

In step 503, the query process regarding the service registration center is illustrated in FIG. 6. Specifically, the process includes the following steps.

Step 601: The service registration center determines if the query should be conducted based on the template or the service abstract description. If the abstract description provides a template name or template information, the query is conducted based on the template and step 602 is performed; otherwise, the query is conducted based on the service abstract description and step 606 is performed.

Step 602: If the query type is a template based query, the service registration center may detect if a template name is specified. If the template name is specified, perform step 603; otherwise, perform step 604.

Step 603: If a concrete template name is specified in the template description, query the template center to obtain the service list associated with the template. Then, step 610 is performed.

Step 604: If a concrete template name is not specified in the template description, query the template center based on the service portion (e.g, type) of the template description to obtain the associated service list.

Step 605: The template list is filtered based on the operation and parameter information in the template and the template list which matches the template description is obtained so that a service list corresponding to all the templates is obtained from the template list. Then, step 610 is performed.

Step 606: If the query type is a service description based query, the service registration center may detect if a service name is specified. If the service name is specified, step 607 is performed; otherwise, step 608 is performed.

Step 607: If a concrete service name is specified in the service description, query the service center directly so as to obtain a corresponding service list. Then, step 609 is performed.

Step 608: If a concrete service name is not specified in the service description, query the service center based on the service portion (e.g., service type) in the base description of the abstract description to obtain the associated service list.

Step 609: The unqualified services is filtered out from the service list according to the operation, parameter in the concrete service description, or the operation, parameter or combination thereof in the base description of the abstract description.

Step 610: The obtained service list is filtered according to the restriction condition (i.e., extension portion in the service abstract description) and generate a service list which satisfies the query condition; if there is no restriction condition, the step is skipped.

In other words, the service registration process is described hereinafter.

1. A request is made to the registration center for registering a service. The request message includes service information and template information. The service information includes a service ID, a service type, operation, parameter and extension parameters such as QoS, etc. The template information includes a template ID. The template information may be optional information.

2. The service center registers the service after receiving the registration request. The service information is added into the service registration center. The service ID is inserted into a mapping table associated with the template ID in the template center.

The process of template registration is described hereinafter.

1. A request is made to the registration center for registering a template. The request message includes template information and service information. The template information includes a template ID, a service type, operation, parameter, etc. The service information includes a service ID or ID list. The service information is optional.

2. The template center registers the template after receiving the registration request. The template information is added into the template registration center. The service ID is inserted into a mapping table associated with the template ID in the template center.

The process of querying service information based on template.

1. A request is made to the registration center for service information query. The request message includes template information. The template information includes a template ID, etc.

2. After the registration center receives the query request, the mapping table in the template registration center is queried with the template ID so that a corresponding service ID list can be obtained.

3. A query is made to the service registration center via the service ID list and the service information list associated with the service ID list is obtained.

The process of querying template information based on the service.

1. A request is made to the registration center for template information query. The request message includes service information. The service information includes a service ID, etc.

2. After the registration center receives the query request, the mapping table in the template registration center is queried via the service ID so that a corresponding service ID list can be obtained.

3. A query is made to the template registration center via the template ID list and the template information associated with the template ID is obtained.

In addition, a service invocation may be generated based on the abstract description according to one embodiment of the present invention (direct execution). That is, the execution of the composite service may include the execution of the executable script and the execution of the abstract description. The execution of the executable script is prior art, which is omitted for clarity. When the composition engine detects an executable script, the service is invoked immediately. The execution of the entire composite service will not be completed until both the execution of the executable script and the abstract description have been completed. The process of the composition engine directly executing the abstract composite service logic is similar to that of indirect execution. Every time the composition engine detects an abstract description, step 501 to step 506 are performed and service invocation is generated.

In the case where there is no need to generate a concrete composite service logic, the process includes the following steps. Steps 501 to 506 in the FIG. 5 have been illustrated, which will not be described in detail. After step 506 is performed, the process includes the following steps. The service composition engine triggers the service invocation. The service composition engine extracts necessary information, for instance, service address, service name, operation, parameter, etc. from the service information based on the obtained service, so as to generate the service invocation.

Further, in order to subsequently execute the composite service rapidly, the concrete composite service logic needs to be generated after the execution of the abstract composite service logic, so that the concrete composite service logic may be served as the composite service logic when invoking the composite service. In the case where it is necessary to generate a concrete composite service logic, the process includes the following steps. Steps 501 to 508 in the FIG. 5 have been illustrated above, which will not be described in detail below. After step 508 is performed or during performing step 508, the process includes the following steps. The service composition engine triggers the service invocation. The service composition engine extracts necessary information, for instance, service address, service name, operation, parameter, etc. from the service information based on the obtained service, so as to generate the service invocation; or the service composition engine generates the service invocation based on the generated concrete composite service logic segment.

Accordingly, the process for handling concrete service according to one embodiment of the present invention includes: a procedure of the concrete composite service logic generating the abstract composite service logic and a rollback procedure.

Figure 7:
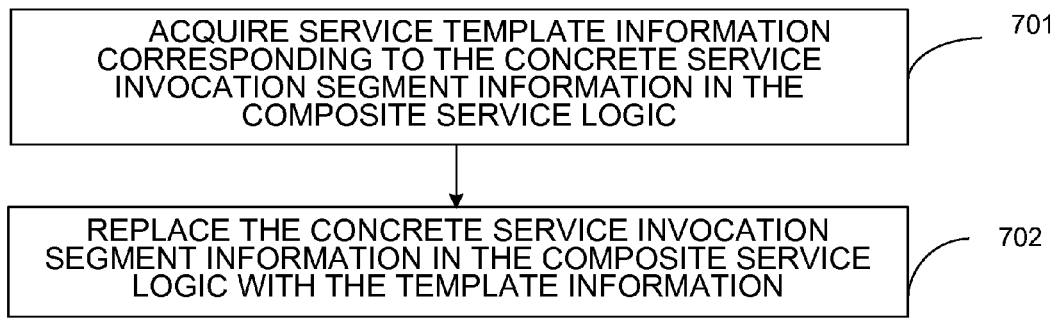
FIG. 7 is a flowchart of a method for replacing a service according to one embodiment of the present invention.

FIG. 7 illustrates a flowchart of a method for replacing a service according to one embodiment of the present invention. The method includes the following steps.

Step 701: Service template information is acquired based on the concrete service invocation segment information in the composite service logic.

The acquiring process includes triggering the service template query request to the service discovery unit based on the concrete service description; sending, by the service discovery unit, the query information to the template center. The query information includes a service name of the concrete service description (i.e., service ID).

The service discovery unit receives service template information associated with the service name and feeds back the service template information wherein the service template information is fed back from the template center. The service template information includes a template name and a template description.

Step 702: The concrete service invocation segment information in the composite service logic is replaced with the template information.

Specifically, base description of the service abstract description is added into the concrete service invocation segment in the concrete composite service logic, and the template name and corresponding template description is added into the base description. At the same time, associated concrete service description is deleted.

Figure 8:
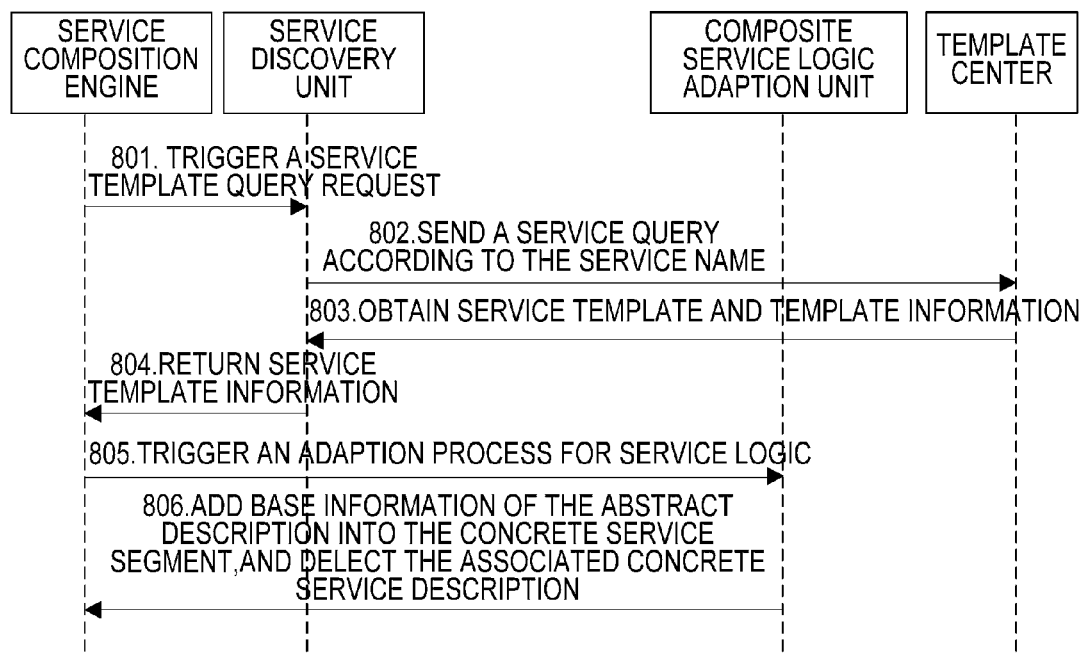
FIG. 8 is a flowchart of a concrete composite service logic generating an abstract composite service logic according to one embodiment of the present invention.

The implementation of the embodiment is described in FIG. 8. FIG. 8 illustrates a flowchart of the concrete composite service logic generating the abstract composite service logic according to one embodiment of the present invention. That is to say, the service composition system provides a process for automatically generating the abstract composite service logic. The following process describes a process of replacing a service invocation segment in the concrete composite service logic with the abstract description (i.e., template description herein). In the process of generating the abstract composite service logic, an abstract composite service logic is generated by just replacing in sequence a concrete service invocation in the concrete composite service logic. When the service composition engine detects a service invocation segment in the concrete composite service logic, the service composition engine triggers a process of replacing service template. Specifically, process includes the following steps.

Step 801: The service composition engine triggers a template query request to the service discovery unit based on the service concrete description in the concrete composite service logic.

Step 802: The service discovery unit queries the template center according to the service name of the service concrete description so as to obtain a service template and extracts the template name and a corresponding template description.

Step 803: The template center returns the service template information to the service discovery unit. The service template information includes a template name and an associated template description.

Step 804: A service discovery unit returns the service template information to the service composition engine.

Step 805: The service composition engine triggers an adaption process for composite service logic and requests the composite service logic adaption unit to replace the concrete service invocation in the concrete composite service logic based on the obtained service template information.

Step 806: The composite service logic adaption unit adds base description of the service abstract description into the concrete service invocation segment in the concrete composite service logic, and adds a template name or template description in base description. At the same time, associated concrete service description is deleted. That is, the service name, service operation, and parameter information in the concrete service description are omitted.

The abstract logic based on template name is given below.

```
<serviceDescription>
    <baseCriteria template=" templateName"/>
</ serviceDescription>
```

Alternatively, the abstract logic based on concrete template description is given below.

```
<serviceDescription>
    <baseCriteria template=" templateName">
        <serviceCriteria>
                <attributeGroup category="categoryName"
                name="keywordValue"/>
        </serviceCriteria>
        <operationCriteria name="keywordValue"/>
        <variableCriteria type="typeName"/>
    </baseCriteria>
</ serviceDescription>
```

When executing the concrete composite service logic, it is possible that the invoked service cannot provide services. At this point, a rollback mechanism is needed to ensure a normal execution of the composite service logic and thus a replaced service is needed to provide service. However, such rollback mechanism is not limited to the service composition.

Figure 9:
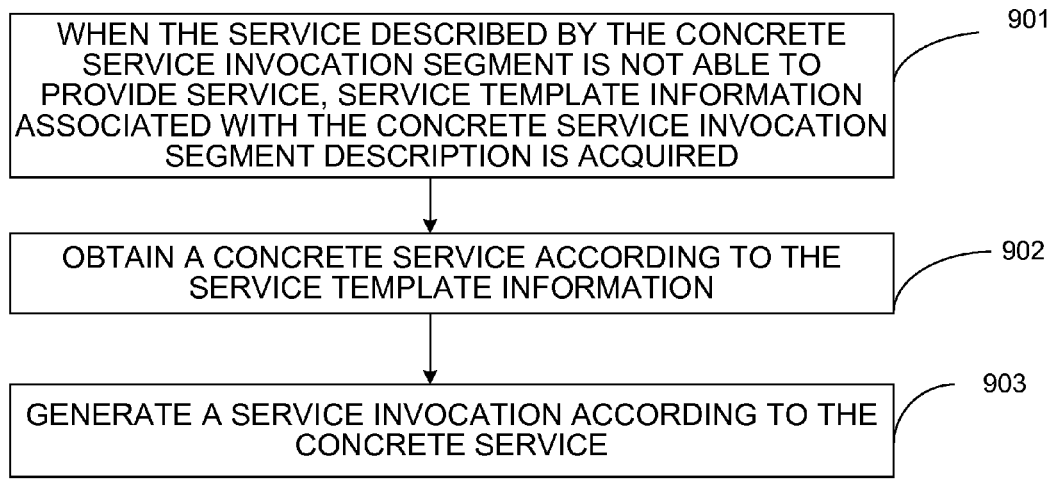
FIG. 9 is a flowchart of a method for invoking a concrete service according to one embodiment of the present invention.

FIG. 9 illustrates a flowchart of a method for replacing service according to one embodiment of the present invention. The method includes the following steps.

Step 901: When the service described by the concrete service invocation segment is not able to provide service, the service template information associated with the concrete service invocation segment description is acquired.

The process of acquiring the service template information associated with the service name of the concrete service description is described below. A service template query request is triggered to the service discovery unit based on the concrete service description. Service query information is sent from the service discovery unit to the template center.

The service query information includes a service name for the concrete service description. The service discovery unit receives the service template information associated with the service name fed back from the template center. The service template information includes a template name and an associated template description. And, the service template information is fed back.

Step 902: A concrete service is obtained based on the service template information.

Step 903: A service invocation is generated based on the concrete service.

Figure 10:
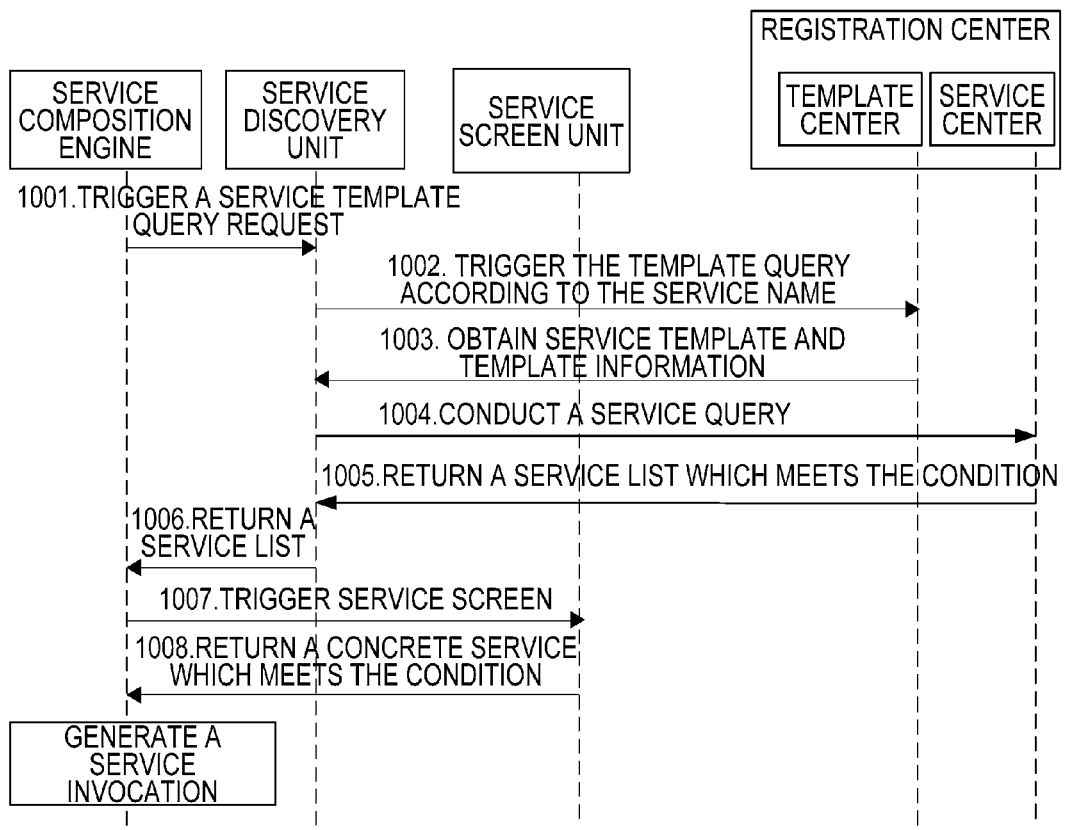
FIG. 10 is a signaling flowchart of a method for replacing a concrete service according to one embodiment of the present invention.

The implementation of the embodiment is described in FIG. 10. FIG. 10 is a rollback (replacing) flowchart according to one embodiment of the present invention. That is to say, when the service composition engine detects a concrete service invocation segment and the invoked service is not able to provide service, the concrete service includes service return invocation failure, or service response timeout, etc, the service composition engine may trigger a rollback mechanism. The process of replacing services includes the following steps.

Step 1001 to step 1003: The service composition engine triggers the template query request to the service discovery unit based on the concrete service description. The service discovery unit obtains a service template according to the service concrete description. The service template includes a template name and an associated template description. The process is similar to step 801 to 803 of the concrete composite service logic generates the abstract composite service logic.

Step 1004: The service discovery unit queries the service registration center for services. The query type is a template description based query. The template information includes a template name or a concrete description of the template. The restriction condition is null.

Step 1005: The service registration center conducts the query according to the query information sent by the service discovery unit and returns a service list which meets the requirement of the query condition. The query process of the service registration center is described in steps 601, 602, 603 and step 610 or steps 601, 602, 604, 605 and 610 in FIG. 6, which may not be detailed herein.

Step 1006: The service discovery unit provides an acquired query result, i.e., service list, to the service composition engine. The implementation of this step is similar to step 504, which is omitted herein for brevity.

Steps 1007 and 1008: The service composition engine triggers the service screen unit to perform a service screen and obtain a qualified service. The implementation of this step is similar to steps 505 and 506, which is omitted herein for brevity.

Service invocation is performed after obtaining the qualified service.

In addition, step 1004 in the embodiment may also replace steps 1004 and 1005 in the above described steps. That is, after the service discovery unit conducts the template query, the template center obtains the qualified template directly and queries the template center for the service name corresponding to the template, and queries the service center based on the service name for all the associated service information.

Figure 13:
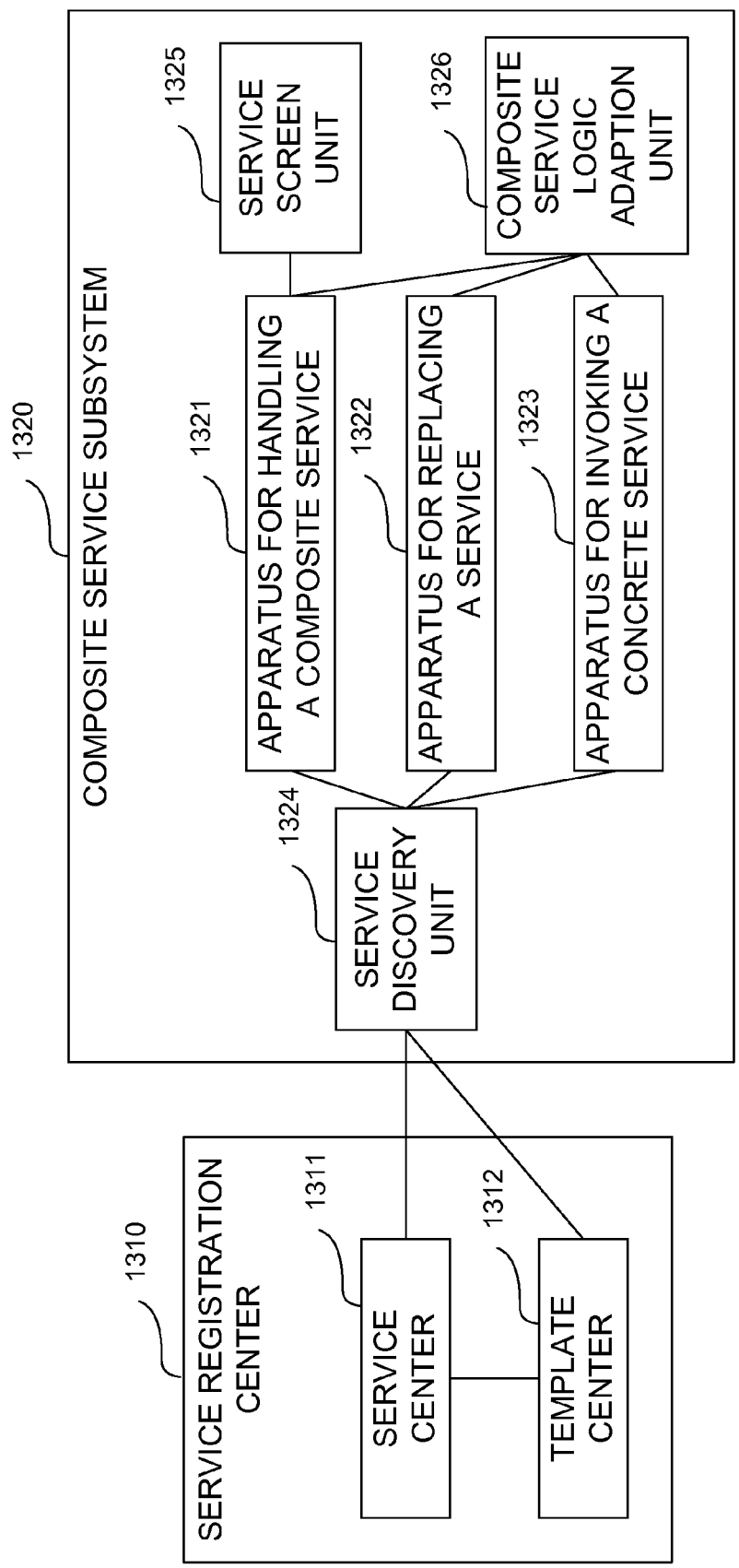
FIG. 13 is a block diagram of a system for composite service according to one embodiment of the present invention.

In addition, a system for composite service is also provided according to one embodiment of the present invention. Referring to FIG. 13, the system includes a service registration center 1310, a composite service sub-system 1320. The registration center 1310 includes:

a service center configured to store service information; and a template center 1312 configured to store template information, and the mapping relationship between the service and the service template.

The composite service subsystem 1320 may include one or more of an apparatus for handling a composite service 1321, an apparatus for replacing a service 1322 and an apparatus for invoking a concrete service 1323.

The apparatus for handling a composite service 1321 may include:

an acquisition unit 112, configured to acquire the concrete service corresponding to the abstract service invocation segment or the service template invocation segment in the composite service logic; and a trigger generation unit, configured to trigger a service composition adaption and request to replace the abstract service invocation segment or the service template invocation segment with the concrete service invocation segment of the acquired concrete service; or, generate a service invocation based on the concrete service.

The apparatus for replacing a service includes:

a template information acquisition unit 211, configured to obtain, when detecting the service invocation segment in the concrete composite service logic, service template information corresponding to the service name of the concrete service description in the concrete composite service logic; and an adaption trigger unit 212, configured to trigger the adaption of the service composition and request to replace the concrete service invocation in the concrete composite service logic with the template information.

The apparatus for invoking a concrete service 1323 may include a template information acquisition unit 311, configured to obtain the service template information associated with the concrete service description when the service described by the concrete service invocation segment is not able to provide services;

a concrete service acquisition unit 312, configured to query a registration center according to the service template information so as to obtain the concrete service which matches the service template; and a service invocation generation unit 313, configured to generate a service invocation based on the concrete service.

Preferably, the composite service subsystem 1320 may further include:

a service discovery unit 1324, configured to generate a service discovery request based on the abstract service description (including template description) and query the service registration center based on the service discovery request and acquire a qualified service list and return the service list;

a service screen unit 1325, configured to screen the service list after receiving a service screening request so as to obtain a qualified service list and select a concrete service from the service list meeting the screening requirement and feed back the concrete service; and a composite service logic adaption unit 1326, configured to replace, when receiving the request for adaption of the composite service logic, the abstract service invocation segment or the service template invocation segment with the concrete service invocation segment of the acquired concrete service.

The functionalities of the service registration center 1310, the apparatus for handling a composite service 1321, the apparatus for replacing a service 1322 and the apparatus for invoking a concrete service 1323 are described above, which are omitted for brevity.

To facilitate the people skilled in the art to understand the present invention, embodiments based on BPEL are provided below.

Before the embodiments are described, the concept of BPEL is introduced below.

BPEL extension description: in BPEL, when a service is invoked, five pieces of information is required. Activity, partnerLink (specifies a concrete service which is equivalent to the above mentioned Service), Operation, inputVariable,outputVariable, and the information related to the service includes partnerLink, operation, inputVariable, outputVariable. The example of the activity invoke is illustrated below.

An executable BPEL script specifies in detail the activity, partnerLink, Operation, inputVariable, outputVariable. That is, the BPEL script specifies a concrete service invocation which is a static service composition. In practice, there is a need for dynamic service composition. That is, there is a need for dynamic service invocation in the process of running a service. To meet the requirement of a dynamic service composition, the existing BPEL needs to be extended so that the BPEL may support the dynamic service composition. At this point, when designing the process description script, a concrete service should not be specified, which means that one or some concrete values for partnerLink, operation, inputVariable, outputVariable may not be specified. However, an appropriate service may be discovered according to the comprehensive information provided by partnerLink, operation, inputVariable, outputVariable and additional service description information. Such dynamic service composition is referred to as a BPEL template based service composition.

The service description may be divided into a base description and an extension description. The base description herein includes a Service description, an Operation description, an inputVariable description and an outputVariable description. The extension description includes descriptions other than Service, Operation, inputVariable, outputVariable, such as QoS description. The base description is used to discover services which meet the requirement from a service catalog during a dynamic service composition, while the extension description is used to select a qualified service from the discovered service.

In the template based service composition, the existing BPEL language needs to be extended. The description of the attribute of the Activity is equivalent to the above mentioned concreteServiceDescription. The description of the element of the activity is equivalent to the above mentioned abstractServiceDescription. As illustrated in Table 2:

TABLE 2

| Activity | Attribute | partnerLink |
| | | Operation |
| | | inputVariable |
| | | outputVariable |

TABLE 2-continued

| Element | baseCriteria | serviceCriteria |
| | operationCriteria | |
| | inoutVariableCriteria | |
| | outputVariableCriteria | |
| extentionCriteria | Qos | |
| | ... | |

In the BPEL template based dynamic composition, at least one values for attributes partnerLink, operation, inputVariable, outputVariable cannot be assigned with a real value. "##" can be used to replace the real value when the attribute cannot be assigned with a real value. For the activity whose attribute value is "##", description is needed in the associated element in the baseCriteria.

The name of partnerLink in the activity in the BPEL is designated. The partnerLinkType is designated in the declaration of the pamerLinks. The portType of WSDL is desginated in the declaration of the partnerLinkType. The declaration of protoType is responsible for describing the invoked service. Therefore, the fact that the partnerLink is not assigned with a real value actually refers to that the portType is not designated.

Example of the description of activity is illustrated hereinafter. The pamerLink and serviceCriteria, Operation and operationCriteria, inputVariable and inputVariableCriteria, outputVariable and outputVariableCriteria correspond to each other. Only when the former value is "##", a complementary description of the latter one will be needed. That is, the extensionCriteria exists only when at least one of partnerLink, serviceCriteria, Operation, inputVariable, outputVariable is "##". The illustration indicates an example of extending a service invocation description of BPEL.

```
<activity partnerLink="##" operation="##" variable="##">
    <baseCriteria>
        <serviceCriteria>
            <attributeGroup category="categoryName"
                name="keywordValue"/>
        </serviceCriteria>
        <operationCriteria name="keywordValue"/>
        <inputvariableCriteria type="typeName"/>
        <outputvariableCriteria type="typeName"/>
    </baseCriteria>
    <extentionCriteria>
        <qos>
            <delaytime unit="timeUnit">value</delaytime>
        </qos>
    </extentionCriteria>
</activity>
```

A First Application Embodiment of the Present Invention

The service center in the service registration center includes following services which is constituted by service name, service category, operation, input, output, and QoS. The service name herein serves as the service ID. As illustrated in Table 3:

TABLE 3

| Service Name | Service Category | | | Operation | Input | QoS | |
| | service area | serviceType | ... | | | Output | delay |
| Wentian Weather Forecast | Shenzhen | Weather Forecast | ... | Query | Address, Time | Temperature, weather | 4 s |

TABLE 3-continued

| Service | Service Category | | | | | QoS | |
|---|---|---|---|---|---|---|---|
| Name | service area | serviceType | ... | Operation | Input | Output | delay |
| Guangdong Weather Forecast | Guangdong | Weather Forecast | ... | Query | Address, Time | Temperature, weather | 8 s |
| Shenzhen Weather Forecast | Shenzhen | Weather Forecast | ... | Query | Address(default = "Shenzhen"), Time | Temperature, weather | 2 s |
| Shenzhen airline ticket | Shenzhen | Booking | ... | Book | Depart, Arrival, Time | electronic-Ticket | |
| | | | | Query | Depart, Arrival, Time | ticketResult | |

15

A template center in the service registration center includes templates associated with the service center and describes a mapping relationship between the service and the template. As illustrated in Table 4:

TABLE 4

| Template name | Service Category Service Type | ... | Operation | Input | Output | Mapping between Service and template |
|---|---|---|---|---|---|---|
| Weather Forecast | Weather Forecast | ... | Query | Address, Time | Temperature, weather | Wentian Weather Forecast, Guangdong Weather Forecast, Shenzhen Weather Forecast |
| Shenzhen airline ticket | Booking | ... | Book | Depart, Arrival, Time | electronicTicket | Shenzhen airline ticket |
| | | | Query | Depart, Arrival, Time | ticketResult | Shenzhen airline ticket |

35

Assume somewhere in the BPEL script requires to invoke a weather forecast service. Assume no concrete service is provided. Only abstract description of the service is provided and concrete service is invoked in the execution process. BPEL script is illustrated below. Only one activity is provided as an example.

```
<process name="compositeService">
<!--Indicate that the entire script describes a composite service named "compositeService"-->
<partnerLinkType name=" weatherQueryLT ">
    <plnk:role name="weatherForecastService" portType="##" />
<partnerLinkType>
<!--describe partner type, specify invoked service, which is mainly described by portType in
the web service-->
   <partnerLinks>
       <partnerLink name="customer" partnerLinkType="weatherQueryLT"/>
   </partnerLinks>
<!--indicate that the composite service has a partner service where in this example is
"customer". The real identity is designated by parterlinks which is indirectly designated by
porttype -->
   <variables>
      <variable name="weatherRequest" messageType="weatherRequestType">
         <complexType name="weatherRequestType">
            <element name="address" type="string"/>
            <element name="time" type="date"/>
         </complexType>
      </variable>
      <variable name="weatherResponse" messageType="weatherResponseType">
         <complexType name="weatherResponseType">
            <element name="temperature" type="string"/>
            <element name="weather" type="string"/>
         </complexType>
      </variable>
   </variables>
<!--define associated variables-->
  <sequence>
```

```
<!--"Sequence" herein indicates that the internal procedure is "sequence". -->
    <invoke partnerLink="customer"
        operation=" query "
        inputVariable =" weatherRequest "
        outputVariable =" weatherResponse ">
        <baseCriteria>
            <serviceCriteria>
                <attributeGroup category="area" name="Shenzhen"/>
                <attributeGroup category="serviceType" name="WeatherForecast"/>
            </serviceCriteria>
        </baseCriteria>
        <extentionCriteria>
            <qos>
                <delaytime unit="s">6</delaytime>
            </qos>
        </extentionCriteria>
    </invoke>
<!--the foregoing is a description of a service invocation. -->
    </sequence>
</process>
```

After processed by the service composition engine, a concrete BPEL script is generated. The abstract description of the service is all replaced with the concrete description. An example of BPEL, i.e., concrete BPEL script, is illustrated below.

```
<process name="compositeService"
    xmlns:sif="http://example.com/SZWeatherForecast/interface/">
    <partnerLinkType name=" weatherQueryLT ">
        <role name="weatherForecastService"
            portType="sif: shippingServicePT" />
    <partnerLinkType>
    <partnerLinks>
        <partnerLink name="customer"
        partnerLinkType="weatherQueryLT"/>
    </partnerLinks>
    <variables>
        <variable name="weatherRequest"
        messageType="weatherRequestType">
            <complexType name="weatherRequestType">
                <element name="address" type="string"/>
                <element name="time" type="date"/>
            </complexType>
        </variable>
        <variable name="weatherResponse"
        messageType="weatherResponseType">
            <complexType name="weatherResponseType">
                <element name="temperature" type="string"/>
                <element name="weather" type="string"/>
            </complexType>
        </variable>
    </variables>
    <sequence>
        <invoke partnerLink="customer"
            operation=" query "
            inputVariable =" weatherRequest "
            outputVariable =" weatherResponse ">
        </invoke>
    </sequence>
</process>
```

A Second Application Embodiment of the Present Invention

Generation of a Concrete BPEL from an Abstract BPEL

Assume a client in Shenzhen wants to invoke a composite service and the composite service invokes a weather forecast service. The embodiment describes a process of dynamically searching for a weather forecast service and replacing the abstract service description. The BPEL script is illustrated above-mentioned abstract BPEL script.

The service screen unit defines the following policies. Service with high QoS is selected under the same condition.

1. Service composition engine checks BPEL script. When the service composition engine detects that the partnerLink is not assigned with a concrete value (although the value of the partnerLink is "customer", however, the partnerLinkType specified by "customer" is "weatherQueryLT" and the "portType" specified by "weatherQueryLT" is null), which means that no concrete service is specified and which further means that the BPEL script is an abstract BPEL, then the service composition engine triggers the abstract description based service composition.

2. After determining that the script is an abstract description, the service composition engine queries the service discovery unit based on the abstract description of the invoked service. The abstract description is illustrated below.

```
<serviceDescription partnerLink="customer" operation=" query "
    inputVariable =" weatherRequest "
    outputVariable =" weatherResponse ">
    <baseCriteria>
        <serviceCriteria>
            <attributeGroup category="area"
                name="Shenzhen"/>
            <attributeGroup category="serviceType"
                name="WeatherForecast"/>
        </serviceCriteria>
    </baseCriteria>
    <extentionCriteria>
        <qos>
            <delaytime unit="s">6</delaytime>
        </qos>
    </extentionCriteria>
</serviceDescription>
```

The query information generated by the service composition engine includes a query type, a service description and a restriction condition. Since a concrete operation, parameters are provided in the abstract description, the query type herein is a service description based query rather than a template based query (when template name is provided and none of the values for concrete service, operation, parameters is provided, then this is a template based query).

Operation, inputVariable, and outputVariable of the concrete service description are all assigned with a concrete value, except for Service. Detailed description except for service is given below.

operation="query" inputVariable="weatherRequest" outputVariable="weatherResponse" Base description portion of the abstract service description is given below:

```
<baseCriteria>
    <serviceCriteria>
        <attributeGroup category="area"
        name="Shenzhen"/>
        <attributeGroup category="serviceType"
        name="WeatherForecast"/>
    </serviceCriteria>
</baseCriteria>
```

The service description is comprised of the above base description portion and the concrete description portion.

The extension description of the abstract service description is extracted as a restriction condition which is described below.

```
<extentionCriteria>
    <qos>
        <delaytime unit="s">6</delaytime>
    </qos>
</extentionCriteria>
```

3. The service registration center conducts a query according to the query information provided by the service composition engine. Since the query type is a service description based query, and a concrete service name is not specified in the service description, query is conducted in the service center according to the service part in the base description of the abstract description. Query can be conducted in the service center of the service registration center according to the requirement that the area is "Shenzhen" and the service type is "WeatherForecast". As a result, "Wentian Weather Forecast" and "Shenzhen Weather Forecast" meet the requirement.

Then, service is filtered based on the operation (operation="query"), parameters (inputVariable="weatherRequest" outputVariable="weatherResponse") in the concrete service description, both of the services meet the requirement.

Then, service is filtered according to the QoS demands in the restriction condition, both of the services meet the demand and a service list is generated. The service list includes two services: "Wentian Weather Forecast" and "Shenzhen Whether Forecast".

The service registration center returns the service list to the service discovery unit.

4. The service discovery unit provides an acquired query result, i.e., service list, to the service composition engine.

5. The service composition engine triggers a screening process according to the acquired service list and sends the service list to the service screen unit.

6. The service screen unit screens the service list according to its own screening requirement and filters out the unqualified service. Since the service screen unit defines a policy of "selecting service with high QoS under the same condition", after comparing the QoS of "Wentian Weather Forecast" and "Shenzhen Weather Forecast", it is discovered that the "Shenzhen Weather Forecast" can provide a better QoS, then "Shenzhen Weather Forecast is selected and provided to the service composition engine.

7. The service composition engine triggers the adaption for composite service logic according to the obtained "Shenzhen Weather Forecast" and requests the composite service logic adaption unit to replace the abstract description based on the concrete service provided.

8. The composite service logic adaption unit extracts necessary information from the service information (portType information, including namespace), and completes the concrete service description in the abstract service description (portType in the partnerLinkType), and meanwhile deletes the base description and extension description of the abstract service description.

The generated BPEL script is illustrated in above-mentioned concrete BPEL script.

A Third Application Embodiment of the Present Invention

I.e., Generation of a Service Invocation Based on Abstract BPEL

The assumption of this embodiment is similar to that of the previous embodiment. The embodiment describes a process of dynamically searching a weather forecast service and generating a service invocation. The BPEL script is illustrated in above-mentioned abstract BPEL script.

1-6: similar to "generation of a concrete BPEL from an abstract BPEL", which is omitted herein for brevity.

7: The service composition engine triggers the service invocation. The service composition engine extracts necessary information, for instance, service address, service name, operation, parameter, etc. from the service information according to the obtained service, so as to generate an SOAP invocation. An example of the SOAP message is illustrated below.

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
    <SOAP-ENV:Body>
        <SZWeatherForecast:Query xmlns:SZWeatherForecast ="Some-
        URI">
            <address>Shenzhen</address>
            <time>20070520</time>
        </SZWeatherForecast:Query>
    </SOAP-ENV:Body>
</SOAP-ENV:Envelope>
```

If it is necessary to generate a concrete composite service logic after executing the abstract BPEL, the process is described hereinafter.

1-8: similar to "generation of a concrete BPEL from an abstract BPEL", which is omitted herein for brevity.

9: The service composition engine triggers the service invocation. The service composition engine extracts necessary information, for instance, service address, service name, operation, parameter, etc. from the service information based on the obtained service, so as to generate the service invocation; or the service composition engine generates the service invocation directly based on the generated BPEL segment.

A Fourth Application Embodiment of the Present Invention

I.e., Generation of an Abstract BPEL from a Concrete BPEL

Assume a concrete BPEL script is consistent with the above-mentioned concrete BPEL script. An abstract BPEL script is automatically generated after the abstract BPEL procedure is handled. In this embodiment, the concrete "Shenzhen Weather Forecast" service is replaced with "weather forecast" template.

When the service composition engine detects a service invocation segment in the concrete BPEL script, the service composition engine triggers a process of replacing service template.

The service composition engine triggers a template query request to the service discovery unit based on the service concrete description in the concrete BPEL.

Relevant services are described below.

```
<process name="compositeService"
    xmlns:sif="http://example.com/SZWeatherForecast/interface/">
    < partnerLinkType name=" weatherQueryLT ">
        <role name="weatherForecastService"
            portType="sif: shippingServicePT" />
    <partnerLinkType>
    <partnerLinks>
        <partnerLink name="customer"
            partnerLinkType="weatherQueryLT"/>
    </partnerLinks>
        <invoke partnerLink="customer"
            operation=" query "
            inputVariable =" weatherRequest "
            outputVariable =" weatherResponse ">
        </invoke>
```

1. The service discovery unit acquires a service name from the service concrete description. The partnerLink herein is "customer", but "customer" is not the real service to be invoked. The "partnerLinkType" acquired from "customer" is "weatherQueryLT." The corresponding "portType" acquired from the "weatherQueryLT" is "sif:shippingServicePT." Subsequently, the service description is obtained according to the value of portType and namespace and thus the service name is determined. Here, the service name is SZWeatherForecast (Shenzhen Weather Forecast).

2. A template center is queried according to the acquired service name so as to obtain a service template of "Shenzhen Weather Forecast". The template name and a corresponding template description are extracted. The template is described below.

```
<templateDescription template="weatherForecastTemplate">
    <serviceCriteria>
        <attributeGroup category="serviceType" name="weatherForecast"/>
    </serviceCriteria>
    <operationCriteria name="Query"/>
    <inputVariableCriteria type=" weatherRequest "/>
    <outputVariableCriteria type=" weatherResponse "/>
</ templateDescription>
```

1. The template center returns the service template information to the service discovery unit. The service template information includes a template name and an associated template description.

2. The service discovery unit returns the service template information to the service composition engine.

3. The service composition engine triggers an adaption process for composite service logic and requests the composite service logic adaption unit to replace the concrete service invocation segment in the concrete composite service logic according to the obtained service template information.

4. The composite service logic adaption unit adds a base description portion of the service abstract description in the concrete service invocation segment of the concrete composite service logic. Since it is template based replacement, the fields in the base description are all null, i.e., portType, Operation, inputVariable, outputVariable are all replaced with "##". The composite service logic also adds a base description of the abstract service in the base description portion, which is used to describe Service (i.e., portType), Operation, inputVariable, outputVariable. The content of the description is provided by template information.

The generated abstract BPEL description is as follow.

```
<process name="compositeService"
    xmlns:sif="##">
    < partnerLinkType name=" weatherQueryLT ">
        <role name="weatherForecastService"
            portType="sif: ##" />
    <partnerLinkType>
    <partnerLinks>
        <partnerLink name="customer"
            partnerLinkType="weatherQueryLT"/>
    </partnerLinks>
    <sequence>
        <invoke partnerLink="customer"
            operation=" ## "
            inputVariable =" ## "
            outputVariable =" ## ">
            <baseCriteria template="weatherForecastTemplate">
                <serviceCriteria>
                    <attributeGroup category="serviceType"
                        name="WeatherForecast"/>
                </serviceCriteria>
                <operationCriteria name="Query"/>
                <inputVariableCriteria type=" weatherRequest "/>
                <outputVariableCriteria type=" weatherResponse "/>
            </baseCriteria>
        </invoke>
    </sequence>
</process>
```

A Fifth Application Embodiment of the Present Invention

I.e., the Implementation of Rollback

When executing a concrete BPEL, since BPEL can only provide a static service composition, it is possible that the invoked service might already become invalid when executing BPEL script. According to this embodiment, when the invoked "Shenzhen Weather Forecast" service is invalid when executing BPEL script, the service composition engine provides another service for invocation. Assume BPEL script is the above-mentioned concrete BPEL script. Specifically, 1. When the service composition engine executes "Shenzhen Weather Forecast" in the concrete BPEL and when the invoked service is not able to provide service, the service composition engine triggers a rollback mechanism.

2. The service composition engine triggers a service query request to the service discovery unit according to the service concrete description in the concrete BPEL script. The service discovery unit queries the template center according to the service name in the service concrete description and obtains a template associated with the service. Here, the template is "Weather Forecast" template. The implementation of this step is similar to steps 2, 3, 4 of concrete BPEL generating the abstract BPEL, which is omitted herein for brevity.

3. The template center obtains a corresponding service, i.e., "Wentian Weather Forecast", "Guangdong Weather Forecast", "Shenzhen Weather Forecast", according to the "Weather Forecast" template, and acquires a concrete service description from the service center. The concrete service description includes a service name, operation, parameters and QoS information, etc. In this step, the service in the template center is only an index and no concrete service description is provided.

4. The service registration center returns a service list to the service discovery unit. The service discovery unit returns the service list to the service composition engine.

5. The service composition engine sends a request for screening service to the service screen unit. Since "Shenzhen Weather Forecast" is not accessible, it is filtered. The QoS of "Wentian Weather Forecast" is higher than that of "Guangdong Weather Forecast", therefore, the service screen unit selects "Wentian Weather Forecast" to provide service.

6. The service composition engine generates a service invocation based on the "Wentian Weather Forecast" provided by the service screen unit. The implementation of this step is similar to steps 7, 8, 9 of abstract BPEL generating a service invocation, which is omitted herein for brevity.

As can be seen, by employing an abstract service description mechanism and a service template mechanism, embodiments of the present invention provides a mechanism for converting an abstract composite service logic into a concrete composite service logic such that the dynamic service composition and dynamic service selection are achieved.

In one embodiment of the present invention, there is also provided a mechanism for directly executing an abstract composite service logic. The mechanism is able to directly generate a service invocation based on the service abstract description. As such, the step of converting into the concrete composite service logic can be omitted. Also, in one embodiment, there is also provided a mechanism for additionally generating a concrete composite service logic when directly executing an abstract composite service logic.

In one embodiment, there is also provided a process for automatically generating an abstract composite service logic, which is able to directly generate the abstract composite service logic based on the concrete composite service logic so as to provide the abstract composite service logic for automatic service composition.

When the service invoked during execution of the composite service logic is not accessible, the service can be rolled back (replaced) dynamically. That is, the concrete service description is converted to a template description and an appropriate service is dynamically selected to replace the invoked service. Accordingly, the invoked service can be dynamically replaced when the invoked service is inaccessible.

The foregoing teachings are merely preferred embodiments of the present invention. It shall be noted that improvements and modifications can be made by the ordinary people skilled in the art without departing from the principle of the present invention. These improvements and modifications shall be construed as fall within the scope of protection of the present invention.

What is claimed is:

1. A method for handling a composite service, comprising:
obtaining, by a service composition engine, a concrete service corresponding to a service invocation segment description in a composite service logic, wherein the service invocation segment is an abstract service invocation segment or a service template invocation segment, wherein the service composition engine supports a direct execution mode and indirect execution mode for the execution of the abstract composite service logic, wherein the direct execution mode refers to that the service composition engine directly executes the abstract composite service logic without firstly converting the abstract composite service logic to the concrete composite service logic, and the indirect execution mode refers to that the service composition engine replaces the abstract composite service logic with the concrete composite service logic first and then executes the concrete composite service logic and invokes the corresponding services; and triggering a service replacement, requesting to replace the service invocation segment with a concrete service invocation segment corresponding to the obtained concrete service; or, triggering a service invocation, requesting to generate a service invocation based on the concrete service, where obtaining a concrete service corresponding to a service invocation segment description in a composite service logic comprises:

generating a service discovery request according to an abstract service invocation segment description, a service template invocation segment description or the obtained service template information;

querying to acquire a service list which contains one or more concrete services matching the query information, according to the service discovery request; and selecting a concrete service from the service list;

and, there is a mapping relationship between the concrete service and the service template and a corresponding concrete service or a service template is found according to the mapping relationship.

2. The method of claim 1, wherein obtaining the service template information comprises:
generating a service template discovery request according to a base description in the abstract service invocation segment information, wherein the base description includes a service type, operation information, parameter information; querying to acquire the service template information that matches the base description, according to the service template discovery request.

3. The method of claim 1, wherein obtaining the service template information comprises:
acquiring the service template information directly based on a template name in the service template invocation segment information.

4. The method of claim 1, wherein generating the service invocation based on the concrete service comprises:
replacing the abstract service invocation segment with the concrete service before generating the service invocation or after generating the service invocation or during generating the service invocation.

5. The method of claim 1, further comprising: generating the service invocation during the replacing process, comprising:
generating the service invocation based on the obtained concrete service before replacement; or
generating the service invocation based on the obtained concrete service or the replaced concrete service invocation segment after replacement; or
generating the service invocation based on the obtained concrete service during replacement.

6. An apparatus for handling a composite service, comprising a processor coupled to a nonvolatile memory storing instructions for executing by the processor, the instructions configuring the processor to perform:
acquiring a concrete service corresponding to an abstract service invocation segment or a service template invocation segment description in a composite service logic, wherein the instructions support a direct execution mode and indirect execution mode for the execution of the abstract composite service logic, wherein the direct execution mode refers to that the service composition engine directly executes the abstract composite service logic without firstly converting the abstract composite service logic to the concrete composite service logic, and the indirect execution mode refers to that the service composition engine replaces the abstract composite service logic with the concrete composite service logic first and then executes the concrete composite service logic and invokes the corresponding services;

triggering a service composition adaption and request to replace the abstract service invocation segment or the service template invocation segment with a concrete service invocation segment of the acquired concrete service; or, generate a service invocation based on the concrete service;

generating a service discovery request according to an abstract service description and query a registration center according to the service discovery request and acquire a qualified service list and return the service list to the service composition engine;

screening the service list after receiving a service screening request from the service composition engine so as to obtain a service list meeting the screening requirement and select a concrete service from the service list meeting the screening requirement and return the concrete service to the acquisition unit; and replacing, when receiving the request for adaption of the composite service logic from the service composition engine, the abstract service invocation segment or the service template invocation segment with the concrete service invocation segment of the acquired concrete service;

where there is a mapping relationship between the concrete service and the service template and a corresponding concrete service or a service template is found according to the mapping relationship.

7. The apparatus of claim 6, wherein the instructions further configure the processor to perform:
triggering an approach of handling composite service logic based on service abstract description, wherein the trigger unit is configured to trigger an invocation and trigger a replacement.

8. The apparatus of claim 6, wherein the instructions further configure the processor to perform generating a service invocation based on the replaced concrete service invocation segment.

9. The apparatus of claim 6, wherein the instructions further configure the processor to perform:
generating a service discovery request according to the abstract service description;
sending service query information to a registration center, wherein the query information comprises a query type, a service description, and a restriction condition; or comprises a query type, a template description and a restriction condition;
receiving a service list which satisfies the query information fed back from the registration center, wherein the service list comprises one or more concrete services; and
feeding back the service list.

* * * * *